US012682659B1

(12) United States Patent
Chatfield et al.

(10) Patent No.: US 12,682,659 B1
(45) Date of Patent: Jul. 14, 2026

(54) SELF-SUPERVISED LEARNING MODEL FOR ROAD FEATURE DETECTION IN DRIVING ENVIRONMENTS

(71) Applicant: Zoox, Inc., Foster City, CA (US)

(72) Inventors: Carl Raymond Chatfield, San Mateo, CA (US); Zhengmao Liu, Palo Alto, CA (US); Tianyu Zhao, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 336 days.

(21) Appl. No.: 18/374,476

(22) Filed: Sep. 28, 2023

(51) Int. Cl.
| | |
|---|---|
| *G06V 20/56* | (2022.01) |
| *B60W 60/00* | (2020.01) |
| *G01C 21/00* | (2006.01) |
| *G06V 10/26* | (2022.01) |
| *G06V 10/764* | (2022.01) |
| *G06V 10/774* | (2022.01) |
| *G06V 10/82* | (2022.01) |

(52) U.S. Cl.
CPC ......... *G06V 20/588* (2022.01); *B60W 60/001* (2020.02); *G01C 21/3852* (2020.08); *G06V 10/26* (2022.01); *G06V 10/764* (2022.01); *G06V 10/774* (2022.01); *G06V 10/82* (2022.01); *B60W 2552/20* (2020.02)

(58) Field of Classification Search
None
See application file for complete search history.

(56) References Cited

U.S. PATENT DOCUMENTS

2024/0281988 A1* 8/2024 Abbott ................... G01S 17/89

* cited by examiner

*Primary Examiner* — Leon Flores
(74) *Attorney, Agent, or Firm* — Lee & Hayes, P.C.

(57) ABSTRACT

Techniques are described for self-supervised training of machine-learned models for detecting road features based on images of a driving environment. The model may be implemented as a neural network having two output heads: a first semantic segmentation head trained to output a likelihood of a particular road feature at various locations in the image, and a second geometric shape trained to output the parameters of a predicted road feature at the various locations. During training, the segmentation head of the model may be trained using labeled data associated with road features (e.g., driveways, lane geometry, etc.). The geometric shape head may be trained based on training data masked by the output of the segmentation head. In some examples, a Voronoi diagram may be generated to expand the labeled training data, and the segmentation output mask may be applied to the Voronoi diagram as the masked training data for the geometric shape head.

18 Claims, 9 Drawing Sheets

300 —

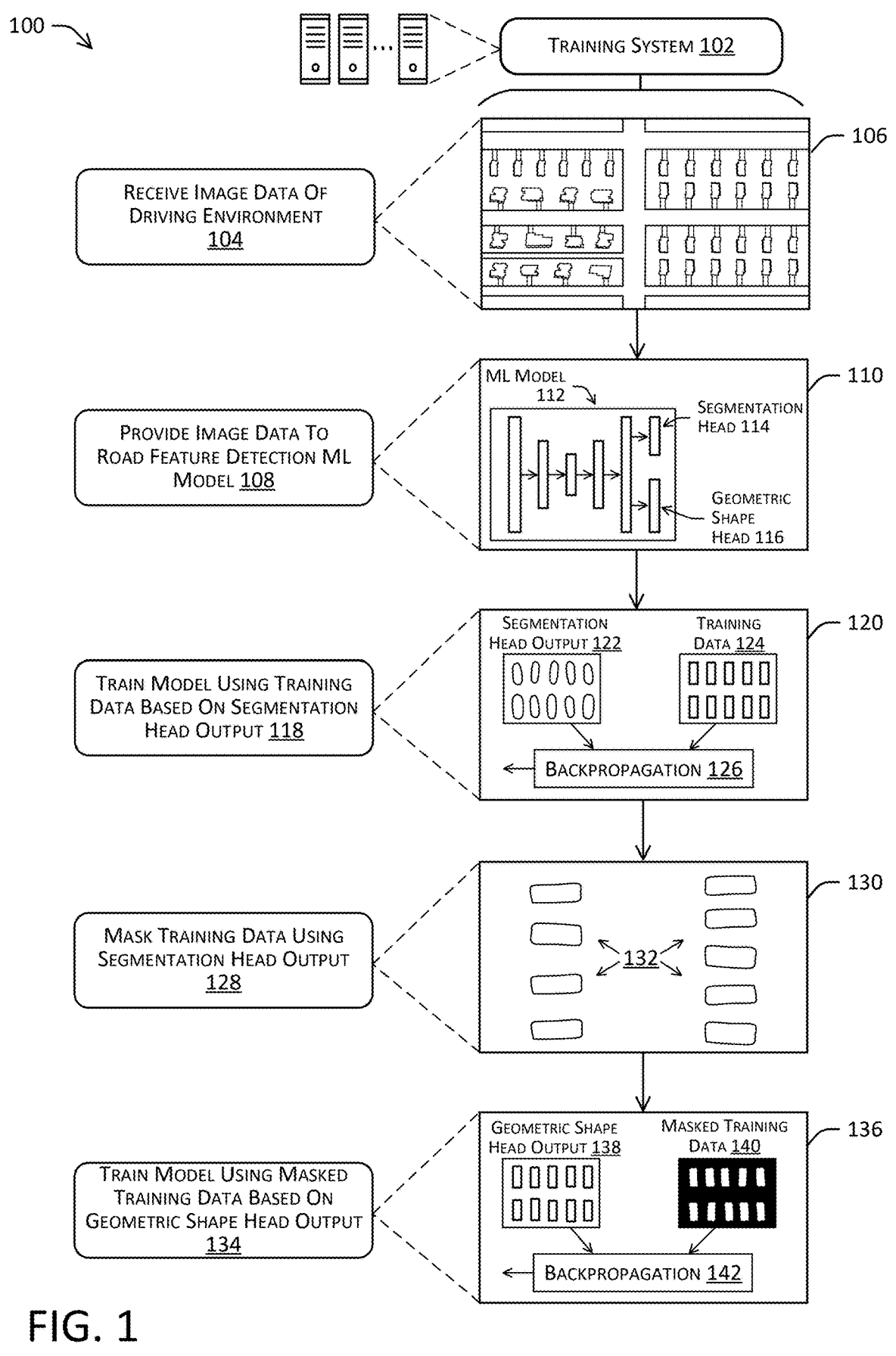

100

TRAINING SYSTEM 102

— 106

RECEIVE IMAGE DATA OF DRIVING ENVIRONMENT 104

PROVIDE IMAGE DATA TO ROAD FEATURE DETECTION ML MODEL 108

ML MODEL 112 — 110

SEGMENTATION HEAD 114

GEOMETRIC SHAPE HEAD 116

TRAIN MODEL USING TRAINING DATA BASED ON SEGMENTATION HEAD OUTPUT 118

SEGMENTATION HEAD OUTPUT 122     TRAINING DATA 124 — 120

BACKPROPAGATION 126

MASK TRAINING DATA USING SEGMENTATION HEAD OUTPUT 128

132 — 130

TRAIN MODEL USING MASKED TRAINING DATA BASED ON GEOMETRIC SHAPE HEAD OUTPUT 134

GEOMETRIC SHAPE HEAD OUTPUT 138     MASKED TRAINING DATA 140 — 136

BACKPROPAGATION 142

FIG. 1

TOP-DOWN IMAGE
DATA 400

LABELED ROAD
FEATURES 402

408

404

406

410

412

VORONOI DIAGRAM 504

VORONOI COMPONENT 314

LABELED ROAD FEATURES 502

500

ROAD FEATURE (E.G., DRIVEWAY) GEOMETRIC SHAPE PARAMETERS 700

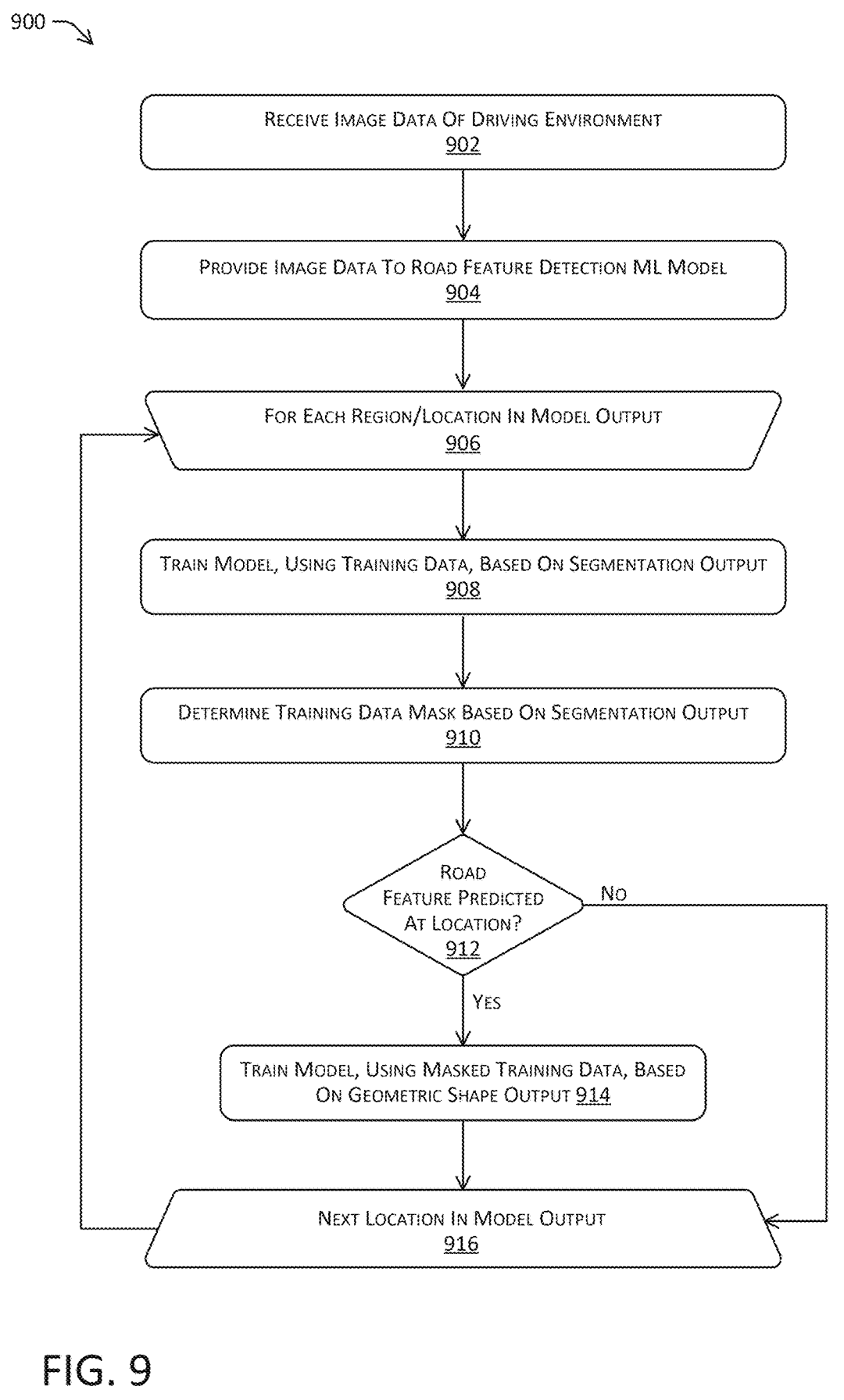

900 —

RECEIVE IMAGE DATA OF DRIVING ENVIRONMENT
902

PROVIDE IMAGE DATA TO ROAD FEATURE DETECTION ML MODEL
904

FOR EACH REGION/LOCATION IN MODEL OUTPUT
906

TRAIN MODEL, USING TRAINING DATA, BASED ON SEGMENTATION OUTPUT
908

DETERMINE TRAINING DATA MASK BASED ON SEGMENTATION OUTPUT
910

ROAD FEATURE PREDICTED AT LOCATION?
912

No

YES

TRAIN MODEL, USING MASKED TRAINING DATA, BASED ON GEOMETRIC SHAPE OUTPUT 914

NEXT LOCATION IN MODEL OUTPUT
916

FIG. 9

SELF-SUPERVISED LEARNING MODEL FOR ROAD FEATURE DETECTION IN DRIVING ENVIRONMENTS

BACKGROUND

Autonomous vehicles utilize various systems, methods, and apparatuses to traverse an environment. For instance, autonomous vehicles utilize route planning methods, apparatuses, and systems to navigate through congested areas where other vehicles, people, buildings, and other objects may be present. In some examples, an autonomous vehicle may make decisions while traversing an environment to ensure safety for passengers, as well as other objects in the environment. Autonomous vehicles can also include sensors to collect information about objects in the surrounding environment, and this information can be used to make decisions about how to traverse the environment. Furthermore, autonomous vehicles can utilize maps of the surrounding environment for making decisions on how to traverse the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates an example technique of self-supervised learning for a machine-learning model configured to detect road features based on image data of a driving environment, in accordance with one or more examples of the disclosure.

FIG. 9 is a flow diagram illustrating an example process for training a machine-learning model having a segmentation output and a geometric shape output and configured to detect road features based on image data of a driving environment, in accordance with one or more examples of the disclosure

DETAILED DESCRIPTION

Figure 2:
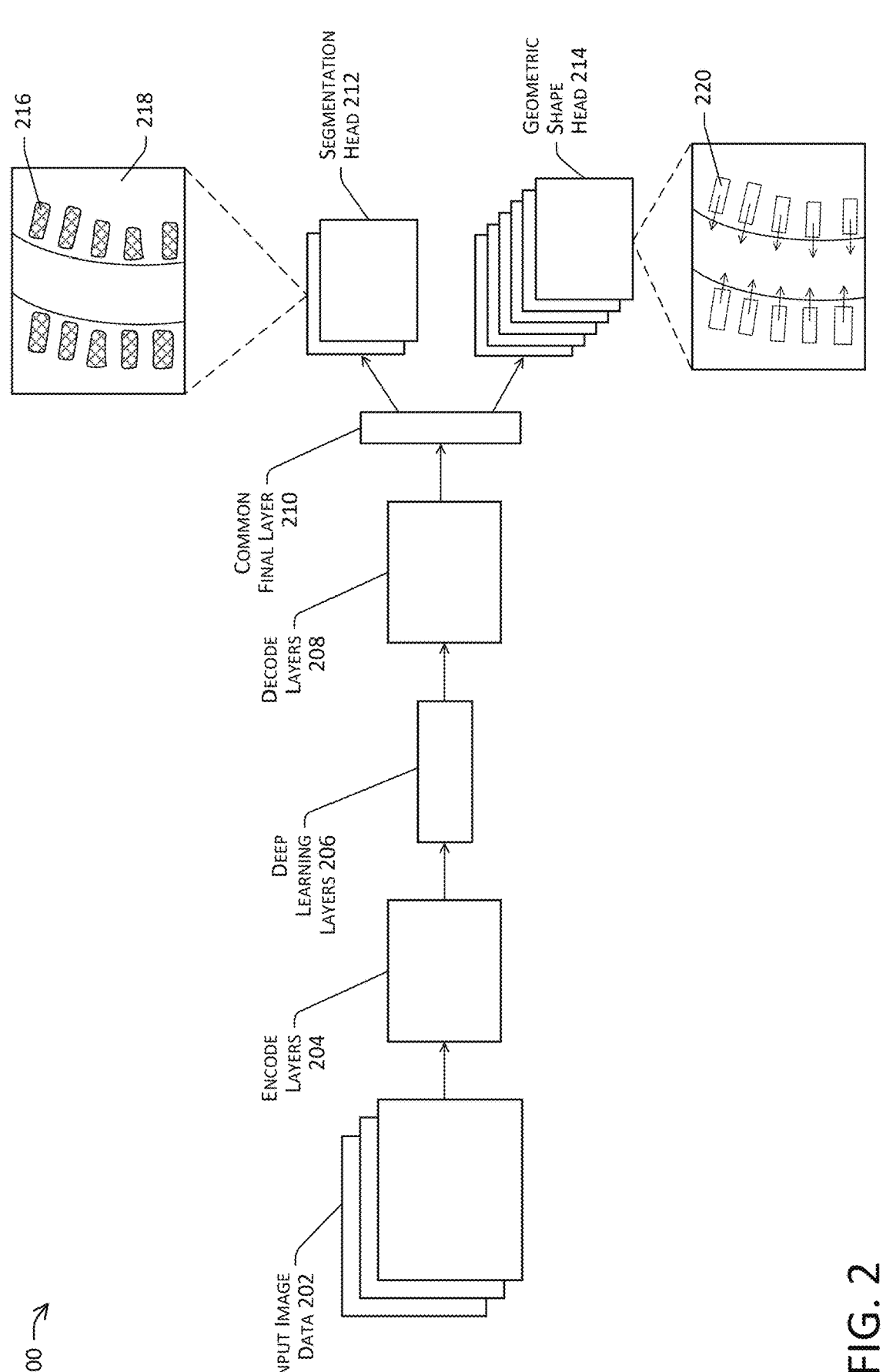
FIG. 2 depicts an example architecture of a machine-learning model configured to detect and predict road features at various locations in the input imagery, the model including a semantic segmentation output head and a geometric shape output head, in accordance with one or more examples of the disclosure.

Techniques described herein relate to using machine-learned (ML) models to detect various road features in a driving environment based on image data of the environment. For example, the machine-learned models described herein may be trained to detect road features such as driveways, parking lots, alleyways, and lane geometry. As noted above, autonomous vehicles may utilize map data to safely and efficiently traverse driving environments. The presence of road features such as driveways, parking lot entrances, or alleyways, or the lane geometry (e.g., road segment dimensions and/or markings) in the driving environment can provide information that an autonomous vehicle may use to predict the behaviors of other vehicles, such as predicting that an occluded car may pull out of a driveway or parking lot, or predicting the driving path of a vehicle based on the lane geometry on the road, etc. However, map data sources that include street/road networks often do not include more detailed road features such as the positions and orientations of driveways, parking lot entrances/exits, as well as the lane geometry (e.g., lane positions and orientations of the lane) and other roadway markings.

Autonomous vehicles may utilize road feature data in a number of ways to predict the behaviors of vehicles and other objects in the environment, and to generate driving routes and/or trajectories to navigate the autonomous vehicle within the environment. In some examples, it may be useful for an autonomous vehicle to use map data including both the likelihood of particular road features (e.g., driveways, lane geometry, etc.) being present at various locations in the environment, as well as the predicted geometric dimensions and orientations of the predicted road features. Thus, an ML model may be trained to perform a semantic segmentation task indicating the likelihood of a particular road feature (e.g., a driveway) at various locations in the environment, and a separate geometric shape task outputting the dimensions and orientations of a predicted road feature at each various location in the environment. Although it may be possible to implement and train different ML models to perform the semantic segmentation task and the separate task of predicting the geometric shape of the road feature, there may be performance and efficiency advantages in training a single model to perform both tasks. For instance, because the semantic segmentation task and the geometric shape prediction task are functionally related and both associated with detecting specific road features within image data, a single ML model having two output heads trained to perform the two tasks simultaneously may perform better than individually training separate models to perform these tasks.

As a result, various examples herein may describe a single ML model having two output heads that are trained simultaneously: a segmentation output head trained to output a likelihood of a road feature at various locations, and a geometric shape output head configured to output the dimensions and/or orientation of a predicted road feature at the various locations. In these examples, the ML model may be implemented as a convolutional neural network (CNN) such as a U-Net encoder-decoder segmentation network, or any other neural network suitable for image segmentation and/or classification. Additionally or alternatively, the ML model may be implemented using a vision transformer architecture. The machine-learned models described in various examples herein may include a common network backbone comprising any number of decoder, encoder, and deep/or learning layers. In some examples, the model may include a common final network layer, with a first subset of the output layers (or channels) corresponding to the segmentation head output, and a second subset of the output layers corresponding to the geometric shape head output. The output of the segmentation head and the geometric shape head may be separately fine-tuned by the training system in some examples. Alternatively, in some cases, the trained ML model might not have a common final network layer. Additionally or alternatively, the trained ML model may include one or more additional trained layers (e.g., after the common final layer) associated with one of the output heads.

However, training an ML model with two output heads to perform separate tasks associated with road feature detection (e.g., the semantic segmentation task and the geometric shape prediction) may include a number of technical challenges. For instance, in regions of the image data where the semantic segmentation output indicates that a particular road feature (e.g., driveway) is not present, the ML model will nonetheless output a predicted geometric shape for the non-existent road feature. Training the geometric shape head of the ML model based on such predictions (e.g., where the segmentation head indicates no road feature is present) can degrade the performance of the geometric shape head. Additionally, for small road features such as driveways and lane geometry, the labeled images used as training data may contain only a small number of pixels corresponding to the labeled road features. As a result, certain training techniques may cause the ML model to be trained (or regressed) only from the small portions of the training image labeled as containing road features. This may limit the ML model to only learning from a relatively small number of pixels within the training data, which also may degrade the performance of the ML model and reduce the efficiency of the training process (e.g., requiring large amounts of additional training data to effectively train the model).

To address these technical challenges and improve the training and performance of ML models used to detect road features, the techniques described herein may include implementing self-supervised learning in which the output of the semantic segmentation head of the ML model is used as self-supervision for training the geometric shape output prediction of the ML model. The techniques described herein also may include generating a Voronoi diagram based on the labeled training data. The Voronoi diagram may expand the parameter target image to effectively increase the area within the training data associated with road features. As described herein, the techniques of using self-supervised learning based on the output of the semantic segmentation head; and using a Voronoi diagram to increase the training data associated with road features such as driveways and/or lane geometry, can be used individually or in combination in various examples.

In some examples, during training of the ML model, the segmentation head may be trained based on training data including images labeled with particular road features. The output of the segmentation head may be determined independently for each location in the image data (e.g., pixel by pixel), and the uncertainty of the segmentation may cause the output of the segmentation head to resemble a freeform shape without the precise dimensions of the associated road feature type. To train the geometric shape head of the ML model, the training system may generate a Voronoi diagram based on the labeled training data, and then apply a mask to the Voronoi diagram based on the output of the segmentation head. The geometric shape head then may be trained based on the masked training data. As a result, for any locations (e.g., pixels) in the image data not indicated by the segmentation head as likely to include a road feature, the geometric shape head is not trained (e.g., regressed) based on those locations.

As illustrated by the various examples herein, these techniques provide advantages for training ML models to perform detection, classification, and segmentation of road features in a driving environment. For example, the implementation of self-supervised learning, in which the output of the semantic segmentation head is used to self-supervise the regression of the geometric shape output of the ML model, may improve the performance of the geometric shape head by not regressing in locations where the segmentation head has not semantically classified as including a particular road feature. Further, the generation and use of Voronoi diagram (and/or masking of Voronoi diagram based on the segmentation output) may increase the available training data associated with particular road features, which may provide particular advantages for training ML models to detect, segment, and predict small road features such as driveways and lane geometry. These techniques, used individually or in combination, may allow ML models for detecting road features based on image data to be trained more efficiently (e.g., using less training data) and/or more effectively (e.g., resulting in better performing ML models). In particular, by generating a Voronoi diagram and masking the Voronoi diagram with the output from the segmentation head, the training system described herein can more effectively smooth out the gradient of the function that the geometric shape head of the ML model is learning. That is, because the shape of the segmentation output mask corresponds more closely to the shape of the road feature labels that the geometric shape head is learning to predict, the geometric shape may learn more quickly and more accurately during training.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In examples, the techniques described herein may be utilized in driver-controlled vehicles in which such a system may provide an indication to a driver of the vehicle of whether it is safe to perform various maneuvers. The techniques can be utilized in an aviation or nautical context, or in any system involving objects or entities that may be associated with behavior that is unknown to the system.

FIG. 1 depicts an example self-supervised learning technique 100 for training an ML model to detect road features based on image data of a driving environment. As shown in this example, the operations shown in FIG. 1 may be performed by a training system 102 configured to train an ML model for road feature detection having a semantic segmentation output head and a separate geometric shape output head. The training system 102 may implement self-supervised learning by training (e.g., regressing) the segmentation output head based on training data including labeled images of the driving environment, and training the geometric shape output head using modified trained data masked based on the output of the segmentation head.

At operation 104, the training system 102 may receive image data representing a driving environment. For example, box 106 depicts a top-down (or aerial) image view of a residential neighborhood. As shown in this example, the image data received in operation 104 may include visual (e.g., RGB) image data. However, in other examples, the image data may include, additionally or alternatively, lidar data, radar data, infrared data, depth data, and/or various other types of data modalities. Additionally, although the data shown in box 106 is depicted as a top-down view, in other examples the image data may be ground-level and/or perspective view image/sensor data.

In some instances, the image data received in operation 104 may be generated by the training system 102, based on sensor data captured by one or more vehicles driving within the driving environment. As described below in more detail, such vehicles may include sensors configured to capture sensor data of the environment (e.g., visual images, lidar data, radar data, etc.), and to store the sensor data as log data. The log data may be transmitted to the training system 102 or other remote systems (e.g., external to the vehicle) configured to transform and/or reproject the street-level sensor data captured by the vehicles into top-down views. Additionally or alternatively, the image data received in operation 104 may include aerial imagery captured by traffic cameras, drones, and/or satellite data.

The image data received in operation 104 may correspond to training data for one or more ML models (discussed below) used for detecting and segmenting road features. Accordingly, the image data may include associated labels (e.g., hand-labeled road features, not shown in box 106) representing the sets of parameters associated with one or more types of road features found in the environment. In this instance, the image data received in operation 104 may represent ground truth data for an ML model that is to be trained to detect driveways associated with residential homes. Accordingly, box 106 depicts a residential neighborhood including a number of driveways, which may be labeled accordingly in the corresponding training data. In other examples, similar or identical techniques to those described herein may be used to train ML models to detect and segment various different types of road features, such as lane geometry, parking lots, alleyways, etc. As used herein, a road feature may include any feature associated with a location in a driving environment that can be perceived based on image data and/or other sensor data. However, as noted above, there are particular advantages in training ML models using these techniques to detect and segment road features that might not be included in other map data sources, such as the location, dimensions, and orientations of driveways, parking lot entrances and exits, alleyways, as well as the lane geometry (e.g., positions and orientations of lanes) and other roadway markings (e.g., crosswalks, bike lanes, etc.).

At operation 108, the training system 102 may provide the image data to an ML model configured to receive image data as input, and to output data indicating the particular type of road features (e.g., driveways) detected by the model within the image data. Box 110 depicts an ML model 112 that may be trained by the training system 102 to detect and segment particular road features (e.g., driveways) in this example. The ML model 112 may be implemented using any artificial neural network suitable for image segmentation, including by not limited to U-Net models or other CNN model architectures with encoder-decoder structures and/or deep learning layers. Additionally or alternatively, the ML model 112 may be implemented using a vision transformer model, including any of various transformer ML models configured to perform image detection, segmentation, recognition, and/or other computer vision tasks.

In various examples, the ML model 112 may be configured to output image data having the same X- and Y-dimensions as the 2D image input data (e.g., the same number of pixels in the X and Y directions), but may output multiple layers (or multiple channels) for each corresponding pixel in the input data. For instance, as shown in this example, the ML model 112 includes two separate output heads: a segmentation head 114 and a geometric shape head 116. Thus, in this example, for each location (e.g., pixel) in the input image data, the ML model 112 may output a first subset of output layers representing the output of the segmentation head 114, and a second subset of output layers representing the output of the geometric shape head 116.

As shown in this example, the segmentation head 114 and the geometric shape head 116 share the common backbone of the ML model (e.g., input layers, decoder layers, deep learning layers, encoder layers, etc.), but may be trained separately to perform different tasks and output different types of data. The segmentation head 114 may be trained to output, for each location (e.g., pixel) in the input image, the likelihood of a driveway being present at that location. In contrast, the geometric shape head 116 may be trained to output, for each location (e.g., pixel) in the input image, a set of parameters defining a driveway associated with that location. Although the segmentation head 114 and the geometric shape head 116 share a common backbone of the ML model 112, and potentially may share a common final network layer, in some instances the segmentation head 114 and the geometric shape head 116 may use additional layers separate from one another and/or further fine-tuning of the output heads by the training system.

At operation 118, the training system 102 may train the ML model 112 based on the output of the segmentation head 114. As noted above, the operations of FIG. 1 may be performed as part of a training process (e.g., one iteration of a training process) for training the ML model 112 to detect road features within image data. During the training process, training data (e.g., unlabeled ground truth image data) may be provided as input to the ML model 112, and the corresponding outputs of the ML model 112 may be evaluated (e.g., using a loss function) by comparing the outputs with labeled ground truth image data. Based on the evaluation of each output of the ML model 112 during the training process, the training system 102 may use backpropagation to regress the ML model 112, during which one or more of the internal network layers of the ML model 112 may be modified in some way (e.g., modification of weights, nodes, layers, etc.) based on the loss function.

As shown in box 120, the training system 102 may compare the output of the segmentation head (which may be referred to as the segmentation output 122) to the training data 124. In this example, the segmentation head may be configured to output, for each location (e.g., pixel) in the image data, a likelihood that that location is on or within a driveway. The training data 124 may include driveway labels and/or parameters indicating the locations and dimensions of all driveways within the input image data. The comparison in operation 118 may be performed by a back-propagation component 126, using one or more loss functions configured to evaluate the segmentation output 122 with respect to the training data, and to regress the ML model 112 based on the output.

At operation 128, the training system 102 may mask the training data based on the output of the segmentation head of the ML model 112. In some examples, the training system 102 may generate masked training data by overlaying the segmentation output 122 onto the training data 124 (or modified training data). For instance, as described below in more detail, the training system 102 may be configured to generate a Voronoi diagram based on the training data 124, and then apply the segmentation output 122 to the Voronoi diagram to generate the masked training data. As described below, a Voronoi diagram may contain, for each pixel, parameters encoding the pixel to the nearest driveway in the labeled training data. In contrast to the training data 124, the encoded driveway parameters of the Voronoi diagram may extend to cover the entire image space.

As illustrated in these examples, the training system 102 may generate a Voronoi diagram to effectively expand the size of the road features (e.g., driveways, lane geometry, etc.) within the training data. As shown in box 130, the training system 102 may then mask the Voronoi diagram using a discrete set of freeform shapes 132 from the segmentation output 122, to generate masked training data. In other examples, in addition to or instead of generating a Voronoi diagram, the training system 102 may use various other techniques to effectively expand the training data, including any morphological dilation operation and/or other operation that expands (e.g., adds pixels) to the labeled training data.

In various examples, using the output of the segmentation head 114 to mask the Voronoi diagram (or other modified training data), to generate the masked training data in operation 128, may be performed using various techniques. In some cases, the training system 102 may use the same segmentation output 122 used to train the ML model 112 in operation 118, as the mask to be applied to the Voronoi diagram in operation 128. In other cases, the training system 102 may modify the segmentation output 122 or otherwise for example, by increasing or decreasing the size of the freeform shapes 132 from the segmentation output 122. As discussed below, the segmentation head 114 of the ML model 112 may output data indicating the likelihood that a road feature (e.g., driveway) is present at each location in the image data. In operation 118, the segmentation output 122 may be determined as the subset of pixels having a likelihood that meets or exceeds a likelihood threshold (e.g., more likely than not). However, in operation 128, the training system 102 may use a different likelihood threshold to increase or decrease the size of the freeform shapes 132 (and/or to add or remove freeform shapes 132), which may correspondingly increase or decrease the amount of Voronoi diagram that may be masked. To illustrate, decreasing the per-pixel road feature likelihood threshold may cause the freeform shapes 132 to increase in size and/or for new freeform shapes 132 to appear within the mask shown in box 130. Conversely, increasing the per-pixel road feature likelihood threshold may cause the freeform shapes 132 to decrease in size and/or for certain freeform shapes 132 to disappear from the mask shown in box 130.

Additionally, although examples herein describe using a Voronoi diagram, in other examples, training system 102 may use various other techniques for modifying and/or expanding the encoding of the road features within the training data. For instance, the training system 102 may modify the training data by expanding the size of each driveway (e.g., encoding a surrounding region of N pixels around each labeled driveway in the training data with parameter data for that driveway). Additionally or alternatively, the training system may use one or more map segmentation techniques and/or spatial interpolation techniques (e.g., nearest neighbor interpolation, natural neighbor interpolation, etc.), to modify the training data 124, effectively expanding the size of the road feature encodings (e.g., driveways, lane geometry, etc.) within the training data.

At operation 134, the training system 102 may further train the ML model 112 based on the output of the geometric shape head 116. In some examples, operation 134 may be performed using similar techniques to those described in operation 118. In particular, the training system 102 may evaluate the geometric shape head 116 by comparing (e.g., using a loss function) the geometric shape output 138 with the masked training data 140. As described below in more detail, the output of the geometric shape head 116 may include, for each pixel in the image data, parameter encodings defining a geometric shape associated with a predicted road feature at the pixel location. In some cases, for an ML model 112 trained to detect driveways, the geometric shape output 138 may include six output parameters at each pixel (which may be referred to as layers or channels), the six output parameters defining a rectangular driveway predicted at that pixel in the output image.

In contrast to the training in operation 118, in operation 134, the training system 102 may use masked training data 140 to determine which locations within the output of the ML model 112 are to be evaluated and/or regressed. In this example, the masked training data 140 may correspond to the mask generated in operation 128 based on the output of the segmentation head 114. For any locations (e.g., pixels) within the geometric shape output 138 that correspond to a masked (e.g., darkened) region of the masked training data 140, the training system 102 may determine that the geometric shape output 138 need not be evaluated, and/or that the ML model 112 need not be regressed at those locations. However, for any locations (e.g., pixels) within the geometric shape output 138 that correspond to unmasked regions of the masked training data 140, the training system 102 may evaluate the geometric shape output 138 based on the training data, and may use a backpropagation component 142 to regress the ML model 112 based on evaluation of the geometric shape output 138 at those locations.

As illustrated by this example, the segmentation head 114 and the geometric shape head 116 of the ML model 112 can be trained simultaneously based on their respective outputs in comparison to the training data. However, in these examples, the ML model 112 may be trained/regressed based on the output of the geometric shape head 116 only in regions where the segmentation head 114 predicts that a road feature is present at that location. In contrast, for locations where the segmentation head 114 predicts that no road feature is present, the training/regressing of the ML model 112 may be based only on the output of the segmentation head 114 and not on the output of the geometric shape head 116.

Figure 3:
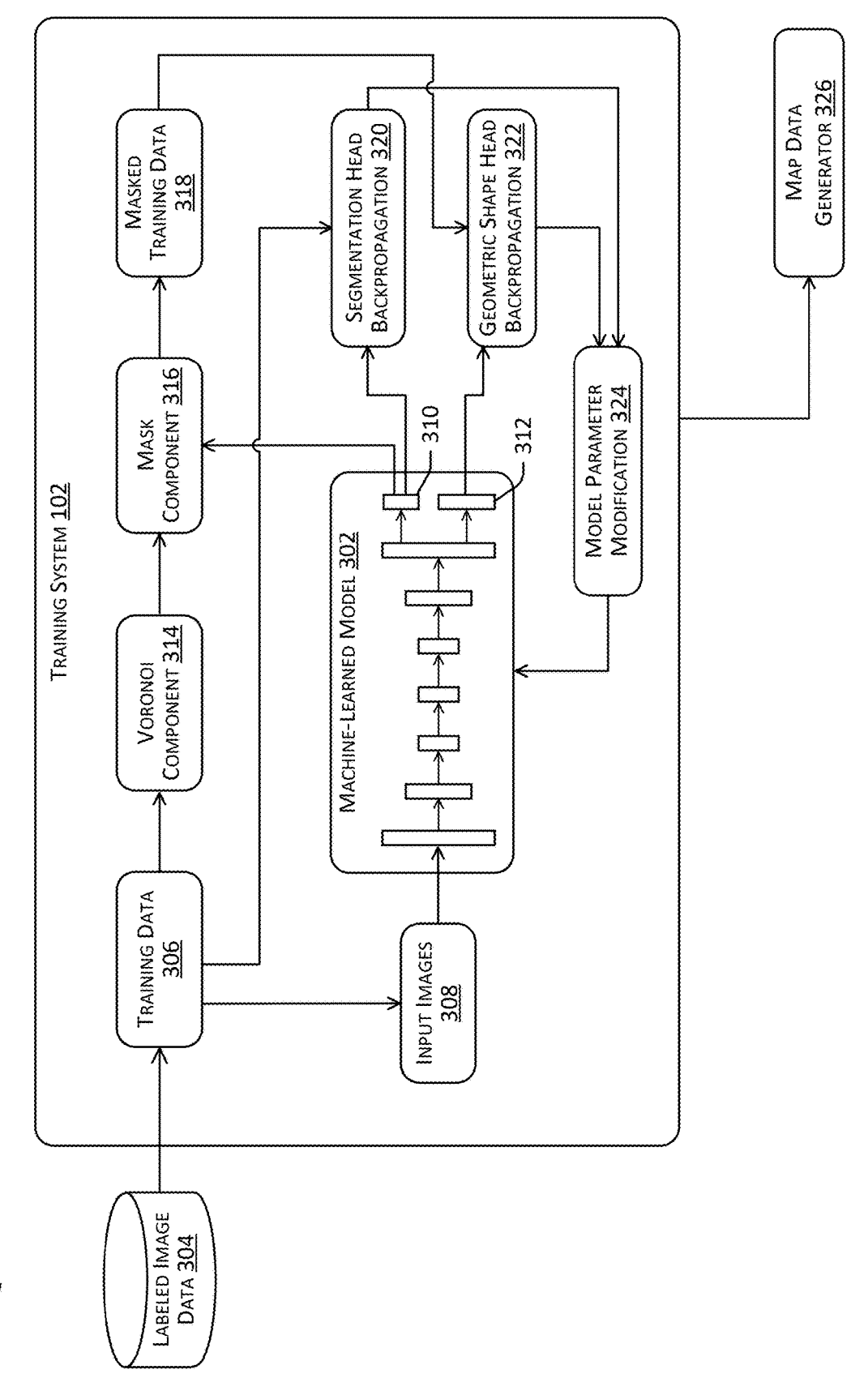
FIG. 3 illustrates an example training system for a machine-learning model having two output heads and configured to detect road features, in accordance with one or more examples of the disclosure.

These techniques can be implemented in various different ways by the training system. For instance, as shown in this example, the training system may use multiple backpropagation components, each associated with a different output head, configured to train the model using separate training operations (e.g., operations to modify the parameters of the ML model) based on the different output heads. In other examples, such as shown in FIG. 3, the training system may be configured to combine (e.g., by summing) the backpropagation values (or loss values) from the separate output heads, and then using the combined/summed backpropagation values to perform a combined training/regression operation to modify the parameters of the ML model 112.

Additionally, these techniques can be performed by first masking the training data (e.g., as shown in operation 128) and then regressing the ML model 112 based on the output of the geometric shape head 116 only in unmasked regions of the environment where the segmentation head 114 predicts that a road feature is likely to be present. In other examples, instead of masking the training data, the training system may apply a similar mask to the backpropagation operations performed to modify the ML model 112. In such examples, the training system might leave the training data unmodified and output a geometric shape prediction for each location (e.g., pixel) within the input data. However, the training system then may determine and apply a mask, using similar or identical masking techniques to those described herein, prior to performing the backpropagation on the ML model 112.

FIG. 2 depicts an example structure of an ML model 200 configured to detect and output road features of a particular road feature type (e.g., driveways, parking lots, alleyways, lane geometry, etc.) within input image data. In some examples, ML model 200 may correspond to ML model 112 described above. As noted above, the ML model 200 may be implemented using any neural network structure suitable for image detection and/or segmentation. For instance, the network structure of ML model 200 may include, but is not limited to, a convolutional neural network (CNN), a U-Net model, and/or vision transformer architectures. In this example, the ML model 200 includes input layers 202, encode layers 204, deep learning layers 206, decode layers 208, and a common final layer 210. As noted above, the common final layer 210 may be shared by the segmentation head and the geometric shape head. In some examples, the common final layer 210 may include a first subset of layers (or channels) corresponding to the segmentation output 212, and a second subset of layers (or channels) corresponding to the geometric shape output 214. Although not depicted in FIG. 2, in some examples the ML model 200 may include additional neural network layers and/or fine-tuning components after the common final layer 210 that are specific to either the segment output 212 or the geometric shape output 214.

As shown in this example, the input layers 202 may include multiple layers (e.g., channels) of input image data. For instance, the input layers 202 may include a first layer (or channel) corresponding to a top-down laser intensity image of the driving environment (e.g., based on lidar data), a second layer (or channel) corresponding to a top-down height gradient image of the driving environment (e.g., depicting differences in the Z-dimension that can be used for distinguishing hard gradient changes such as curbs from softer gradient changes such as driveways and crosswalks), and a third layer (or channel) corresponding to a top-down semantic image of the driving environment (e.g., based on additional preprocessing of the image/sensor data). Although three input layers 202 are depicted in this example, any number of input images may be used in other examples, including input images/channels based on other sensor modalities (e.g., visible images, lidar, radar, radar data, infrared data) and/or input images based on predetermined map data (e.g., road networks, building structure locations and semantic associations, etc.).

As noted above, the segmentation output 212 may encode data indicating, for each pixel in the image data, the likelihood that the pixel corresponds to the particular road feature that the ML model 200 is trained to detect (e.g., a driveway). As shown in this example, the segmentation output 212 may include two distinct layers (or channels), a first layer indicating a likelihood that the pixel corresponds to (e.g., falls on or within) a driveway in the image data, and a second layer indicating a likelihood that the pixel does not correspond to a driveway. Based on the first and second layers of the segmentation output 212, the training system 102 may use likelihood thresholds and/or heuristics (e.g., comparing the positive likelihood to the negative likelihood) to determine which regions of the image are likely to include a driveway (e.g., regions 216) and which regions are not likely to include a driveway (e.g., regions 218). The segmentation output 212 may be determined on a pixel-by-pixel basis for the image. As shown in this example, due to the uncertainty of the segmentation task, the segmentation output 212 is likely to include a number of freeform shapes representing the areas within the image where a driveway is likely to be found. The freeform shapes may have various different sizes, shapes, and orientations, and are unlikely to exhibit the precise geometric dimensions of the associated road feature. For instance, the likelihood regions 216 of the segmentation output in this example are unlikely to be precise rectangular driveway-shaped objects, especially early during the model training process.

The geometric shape output 214 in this example includes six distinct layers (or channels) to encode, for each location/pixel in the image data, six parameters defining the dimensions and orientation of a rectangular driveway at the location of the pixel. For instance, the six layers of the geometric shape output 214 may be used to encode the X and Y coordinates of the center point of the driveway, the width and length of the driveway, and the X and Y slope components defining the orientation of the driveway. Although this example describes training the geometric head of the ML model 200 to output six parameters defining the location and dimensions of a rectangular-shaped road feature, in other examples, the geometric shape output 214 may include any number of layers and may define any type of line or shape representative of any type of road feature.

FIG. 3 is a block diagram illustrating an example architecture 300 including a model training system configured to train and use ML models to detect and segment road features based on image data of a driving environment. In this example, architecture 300 includes the training system 102, configured to receive training data in the form of labeled image data 304 associated with a driving environment, and to use the training data to train the ML model 302 to detect, segment, and predict the presence of a particular type of road feature within the driving environment. The ML model 302 may be similar or identical to the ML model 200 described above, including a segmentation head that may be trained to output pixel-by-pixel predictions of the likelihood that each pixel location in the image data represents an instance of the road feature (e.g., a driveway), and a geometric shape head configured to output a precise geometric shape (e.g., a rectangle) defining the size, shape, and location of a predicted road feature at the pixel location.

As shown in this example, the training system 102 may include a training data component 306 configured to receive the labeled image data 304 (e.g., multi-channel top-down images) of the driving environment. The training data component 306 may extract or exclude the road feature labels from the labeled image data 304, and provide unlabeled images to the input images component 308. The input images component 308 may invoke the ML model 302 and provide the unlabeled input images of the driving environment as input to the ML model 302. The ML model 302, as described above for ML model 200, may use a U-Net architecture configured to output a segmentation head 310 indicating the likelihood of the road feature at each location in the input image data, and a geometric shape head defining the precise size, shape, and location of a potential road feature predicted at the location.

The Voronoi component 314 may be configured to receive the labeled training data from the training data component 306, and to generate a Voronoi diagram based on the labeled training data. A Voronoi diagram based on a labeled training data image may include boundaries (or partitions) between each of the labeled road features in the image. The resulting Voronoi diagram generated by the Voronoi component 314 may define a distinct region for each of the labeled road features in the image, such that each region contains all of the pixels in the image that are closest to that particular road feature. At each distinct location (e.g., pixel) in the Voronoi diagram, the diagram may encode a multidimensional vector that includes similar or identical data to the output of the geometric shape head 312. For instance, each pixel in a Voronoi diagram may include a N-dimensional vector that encodes N layers (or channels) representing the parameters of the nearest road feature to the pixel within the labeled training data. For driveways, as an example, each pixel in the Voronoi diagram may include a six-dimensional vector storing the relative distance (in the X and Y direction) from the pixel to the center of the driveway, the width and length of the driveway, and the orientation (or slope) of the driveway (in the X and Y). Although six-dimensional vectors are used in this example of driveways, the Voronoi diagram may include different sized vectors in other examples based on the type of the road feature and encoding scheme used to represent the position and geometric shape of the road feature or any other parameterization (e.g., an 8-dimensional vector comprising an x- and y-coordinate for each corner of a driveway, three dimensional representations, curvilinear functions, etc.).

As described above, although this example uses Voronoi diagram, in other examples the training system 102 may use additional or alternative techniques for modifying and expanding the labeled training data, including map segmentation techniques and/or spatial interpolation techniques. The mask component 316 may be configured to receive the Voronoi diagram from the Voronoi component 314 based on labeled training data, and to mask the Voronoi diagram based on the output of the segmentation head 310. As shown in this example, the output of the segmentation head 310 may be provided to a segmentation head backpropagation component 320 to determine the regression/backpropagation to be performed based on the prediction made by the segmentation head 310. Additionally the output of the segmentation head also may be provided to the mask component 316, which may determine a segmentation mask based on the output of the segmentation head 310, and apply the segmentation mask to the Voronoi diagram to generate a masked Voronoi diagram. The masked Voronoi diagram may be provided to the masked training data component 318.

As described above, the ML model 302 may be trained to perform both the semantic segmentation of the image data (e.g., as output by the segmentation head 310) and to predict the precise location and geometric size/shape of a road feature at the location (e.g., as output by the geometric shape head 312). To perform the training, the ML model 302 may use one or more backpropagation components (e.g., loss functions) to evaluate the outputs of the segmentation head 310 and geometric shape head 312, and to regress the ML model 302 based on the evaluation. In this example, a first backpropagation component 320 may compare the segmentation output to the unmasked training data received from the training data component 306, so that the ML model 302 can be regressed based on the comparison. Additionally, a second backpropagation component 322 may compare the geometric shape output to the masked training data received from the masked training data component 318, so that ML model 302 also can be regressed based on the comparison. However, while the first backpropagation component 320 may regress the ML model 302 for the entire image space (e.g., all pixels/regions in the image) within the image data, the second backpropagation component 322 may be configured to regress the ML model 302 conditionally only for those locations in the image that are not masked within the masked training data.

As shown in this example, both the first backpropagation component 320 and the second backpropagation component 322 may provide their respective outputs to a model parameter modification component 324 configured to update the ML model 302 for simultaneous training of the segmentation head 310 and geometric shape head 314. The output of the first backpropagation component 320 may include a first loss function applied to the output of the segmentation head 310, representing a regression to be performed on the ML model 302 based on the accuracy of the prediction of the segmentation head 310. Similarly, the output of the second backpropagation component 322 may include a second loss function applied to the output of the geometric shape head 312. However, as noted above, based on the masking of the training data and/or the masking of the backpropagation output, the second backpropagation component 322 may include regressions based on the predictions of the geometric shape head 312 within the unmasked regions of the image data where the segmentation head 310 has predicted a road feature. The model parameter modification component 324 may combine (e.g., sum) the outputs of the first backpropagation component 320 and the second backpropagation component 322, and use the combined outputs to regress the ML model 302. In other examples, the first backpropagation component 320 and the second backpropagation component 322 can separately train/regress the ML model 302 using separate parameter modification operations, rather than combining their backpropagation outputs as shown in this example.

After the ML model 302 has been sufficiently trained, the model may be used by a map data generator 326 configured to generate map data for use by an autonomous vehicle, based on input images of a driving environment. When generating map data for a vehicle, the map data generator 326 may invoke one or more ML models 306 trained by the training system 102, wherein each ML model 302 may be trained to detect, segment, and predict one or more types of road features. After generating the map data of a particular driving environment, the map data generator 326 may transmit the map data to a vehicle or fleet of vehicles operating at or near the driving environment. In some instances, the map data generated by the map data generator 326 may be specific to particular road feature types (e.g., driveways, lane geometry, etc.), and may be overlayed and/or used to supplement various other maps 824 containing road network data, etc.

Figure 4A:
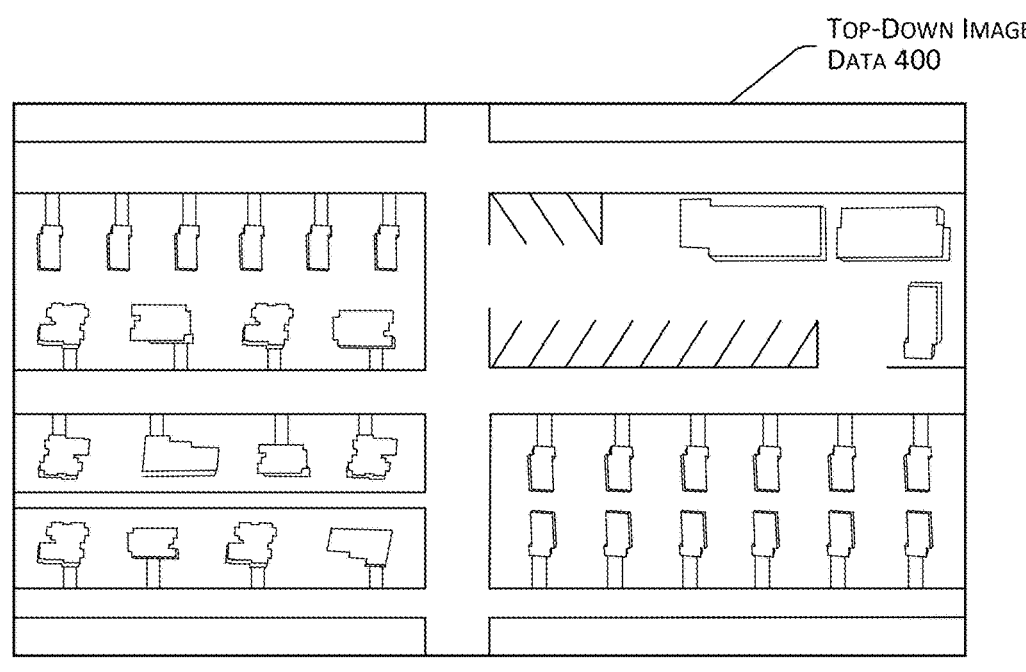
FIGS. 4A and 4B illustrate an example top-down image of a driving environment (FIG. 4A), and corresponding labeled training data (FIG. 4B) associated with the image, in accordance with one or more examples of the disclosure.

FIG. 4A depicts an example of a top-down image representation of a driving environment. In this example, image data 400 may include a single image (e.g., visual RBG or lidar), or may include multiple input layers (e.g., a laser intensity layer, height gradient layer, and semantic layer, etc.) from one sensor modality or a combination of multiple sensor modalities. Image data 400 represents a mixed residential and commercial-use neighborhood, and may be used as training data to train an ML model 302 to detect, segment, and predict the location and dimensions of one or more road features including driveways associated with houses, alleyways, and the entrances and exits of parking lots, etc.

Figure 4B:
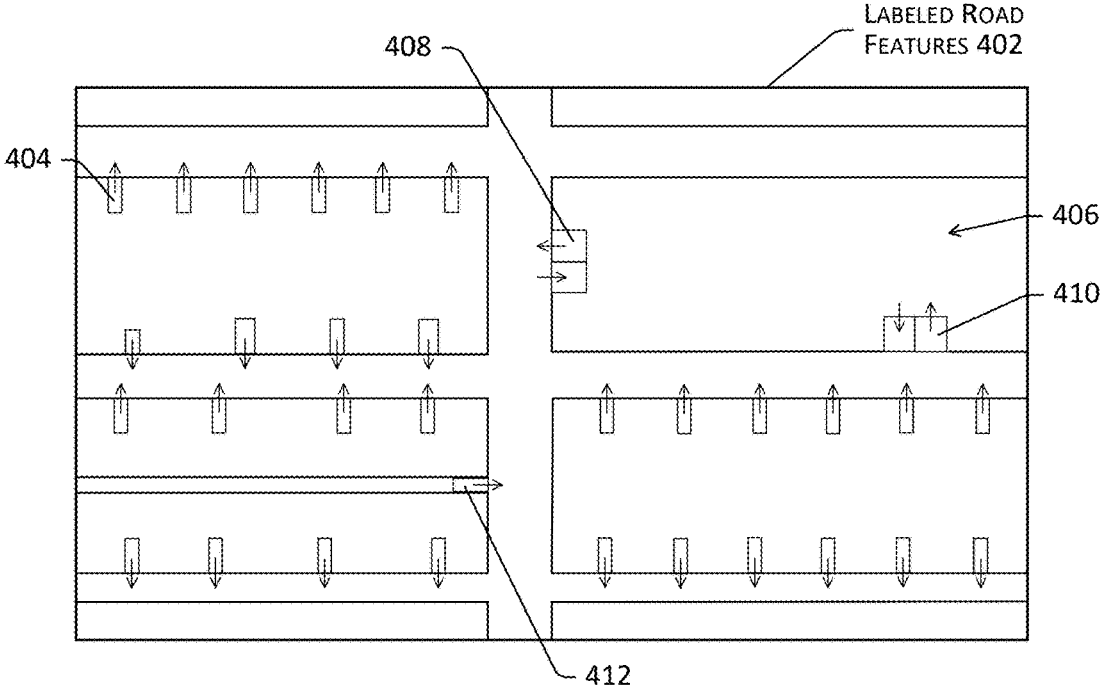

FIG. 4B depicts labeled training data 402 corresponding to the top-down image data 400 shown in FIG. 4A. In various examples, the labeled training data 402 may be generated based on manual hand-labeling by cartographers, and/or may be generated using automated heuristic processes. As shown in this example, the labeled training data 402 identifies a precise geometric shape defining a location, size, and orientation (e.g., a directionality for the flow of traffic) for each driveway (e.g., driveway 404), parking lot entrance/exit (e.g., parking lot exit 408 and entrance 410), and alleyway (e.g., alleyway exit 412) within the image data 400.

Figure 5:
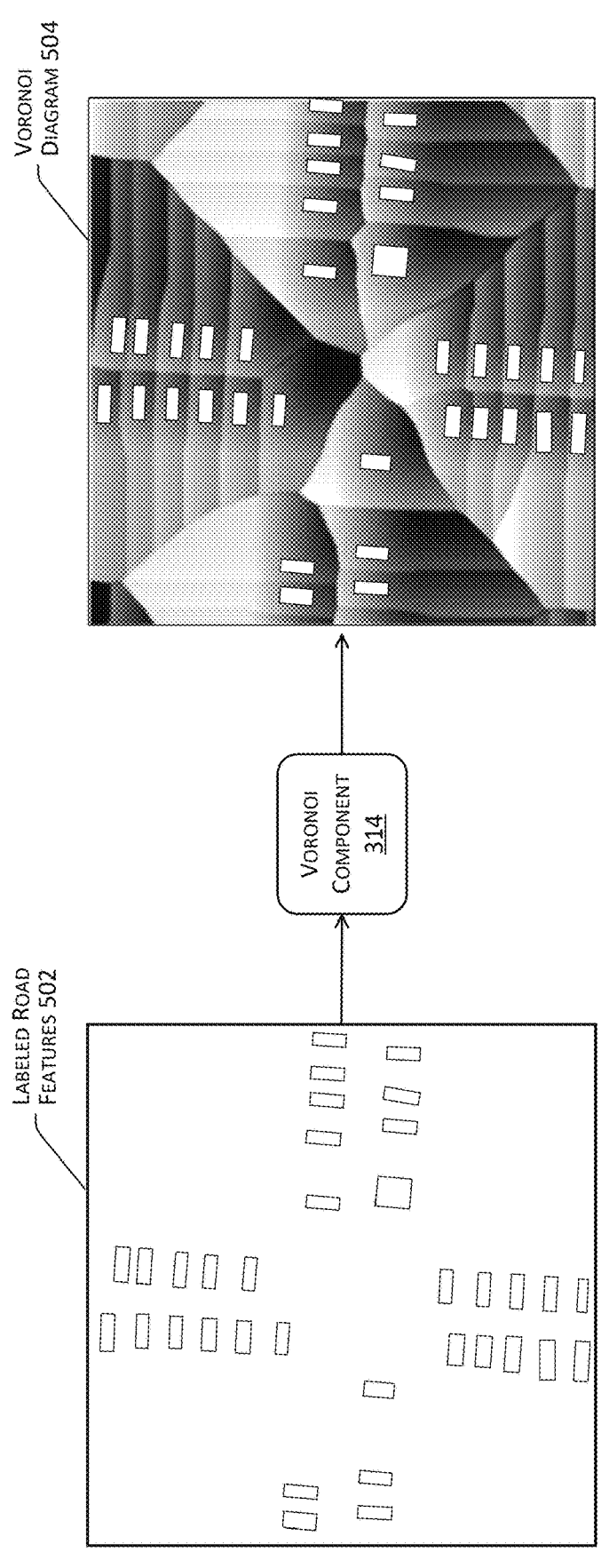
FIG. 5 illustrates a block diagram of an example technique for generating a Voronoi diagram based on labeled training data of a driving environment, in accordance with one or more examples of the disclosure.

FIG. 5 shows a diagram 500 illustrating an example technique of generating a Voronoi diagram based on training data including labeled road features. In this example, the labeled road features diagram 502 includes a number of geometric shapes identified as driveways within the image data used to train the ML model 302. As described above, the Voronoi component 314 may receive the labeled road features diagram 502 and generate a corresponding Voronoi diagram 504. Within the Voronoi diagram 504, each of the labeled driveways is contained within a corresponding region defined by the boundaries of the diagram, and every location (e.g., pixel) in the Voronoi diagram 504 is within the region of the driveway closest to that location. In this example, the corresponding labeled road features are overlayed on top of the Voronoi diagram 504, to illustrate the relationships between each labeled road feature and its corresponding Voronoi region. As noted above, every pixel within the Voronoi diagram 504 may be encoded with the parameters of the closest road feature to that pixel (e.g., the labeled driveway within the same region). The pixel encoding may use the same six-layer encoder described above for the geometric shape output 214, or may use any other encoding technique suitable to identify the labeled road feature with which the pixel is associated.

Figure 6:
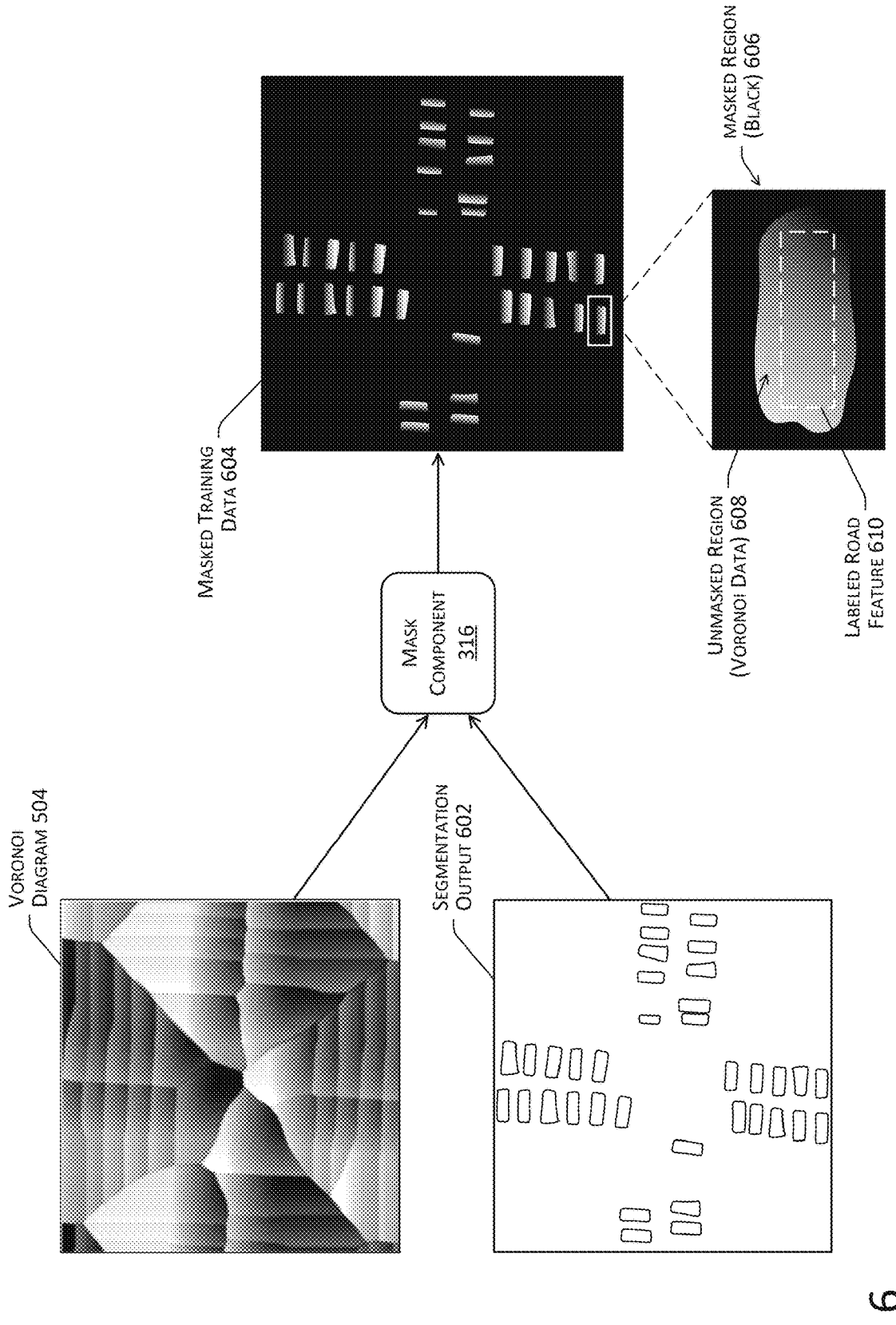
FIG. 6 illustrates a block diagram of an example technique for generating masked trained data based on a Voronoi diagram and a segmentation output from the machine-learning model, in accordance with one or more examples of the disclosure.

FIG. 6 shows a diagram 600 illustrating an example technique of generating masked training data for training the geometric shape head 312 of an ML model 302. As shown in this example, a mask component 316 may receive the Voronoi diagram 504 generated by the Voronoi component 314. Additionally, the mask component 316 may receive a segmentation output 602 from a segmentation head 310 of the ML model 302. The mask component 316 may use the segmentation output 602 to mask the Voronoi diagram 504, to generate the masked training data 604 to be used to regress the geometric shape head 312 of the ML model. As described above, when training the ML model based on the output of the geometric shape head 312, the model may be regressed based on any locations not masked within the masked training data 604. Conversely, for the masked locations in the masked training data 604, the training system 102 may be configured not to evaluate the output of the geometric shape head 312 and/or not to regress the ML model 302 based on those locations, for instance, by not performing or excluding the corresponding backpropagation operation from the training process.

As shown in this example, when the segmentation output 602 is applied as a mask to the Voronoi diagram 504, the resulting masked training data 604 includes masked regions of the environment (depicted as blackened areas) where the geometric shape head will not be trained/regressed, and unmasked regions (depicted with their corresponding Voronoi data at each pixel) where the geometric shape head will be trained/regressed. In this example, a cutout portion of the masked training data 604 has been enlarged for better visibility. The cutout portion in this example is associated with a single region within which the segmentation output 602 has predicted that a road feature is present. Within the cutout portion, the masked region (black) 606 corresponds to pixels at which no road feature is predicted by the segmentation output 602, and the unmasked region (Voronoi data) 608 corresponds to pixels at which a road feature is predicted by the segmentation output 602. Each pixel in the unmasked region 608 may be encoded with the data from the corresponding pixel of the Voronoi diagram 504 (e.g., the parameters defining the closest road feature to that pixel). For comparison, the corresponding labeled road feature 610 is also shown in the cutout portion of the masked training data 604. As shown in this example, the unmasked region 608 at which a road feature is predicted may be larger than the corresponding labeled road feature 610. Thus, by filling the unmasked region 608 within the data from the corresponding region of the Voronoi diagram 504, the geometric shape head 312 of the ML model 302 can be effectively trained within the entire unmasked region 608 (e.g., rather than only within the area of the labeled road feature 610).

Figure 7:
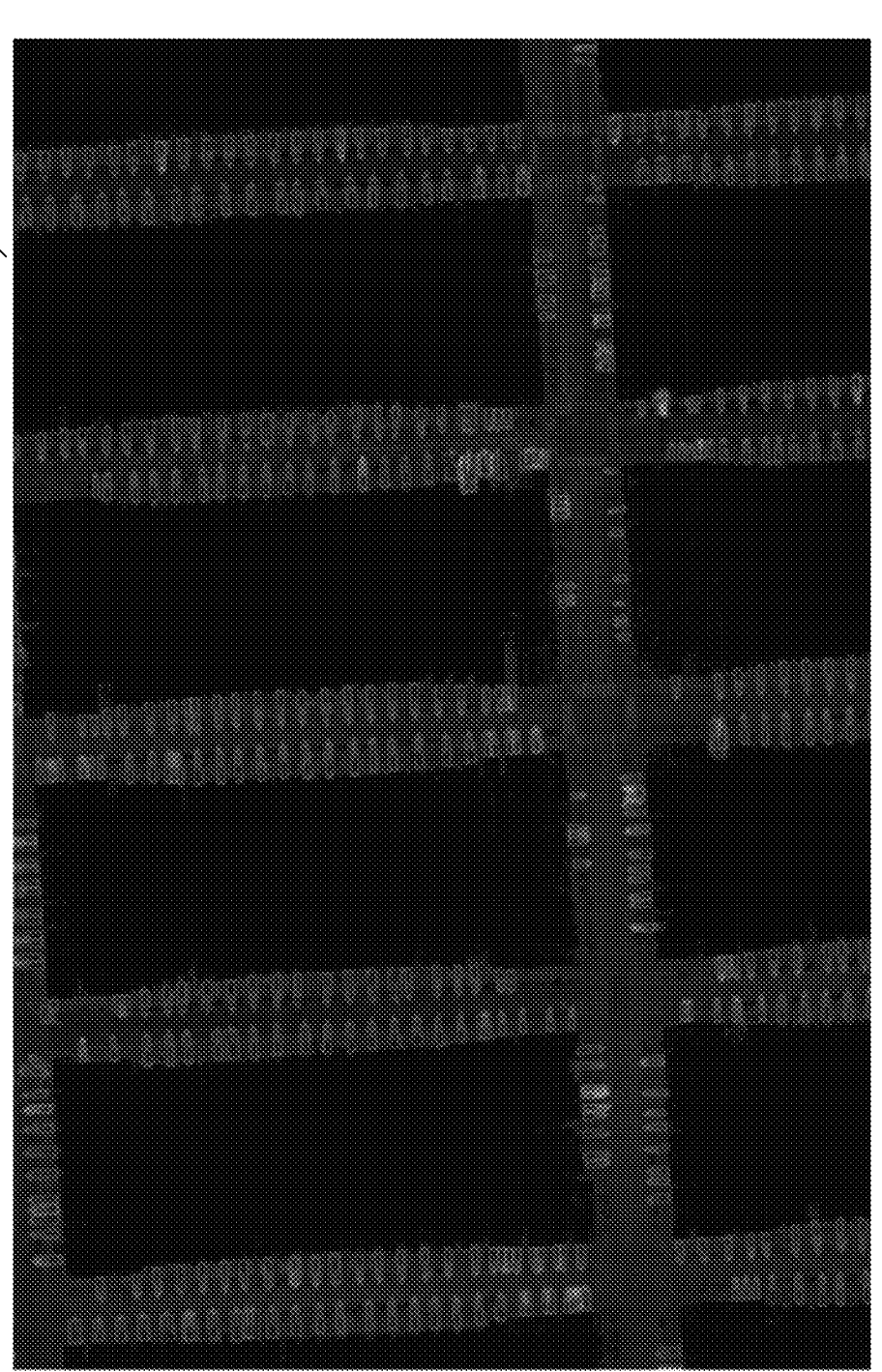
FIG. 7 illustrates an example output from a geometric shape head of a trained machine-learned model configured to detect and predict road features based on image data of a driving environment, in accordance with one or more examples of the disclosure.

FIG. 7 depicts example map data image 700 that may be generated by an ML model 302 trained using a training system 102 as described herein. In this example, the ML model 302 from which the map data image 700 was generated may be trained to detect and segment driveways within a driving environment, based on image data of the driving environment. In particular, the geometric shape head 312 may be configured to output geometric shape data, including precise locations, sizes, shapes, and orientations, for all driveways detected by the segmentation head 310 of the ML model 302. In this example, the geometric shapes of all of the detected driveways are rendered visually within the map data image 700, including arrows to indicate the orientation of the driveway (e.g., the direction of vehicle traffic in and out of the driveway).

As noted above, although this example relates to training ML models to detect and segment driveways, in other examples, other ML models may be trained to detect various other types of road features. Using similar or identical techniques to those described herein, the training system 102 may train an ML model 302 to detect, segment, and predict road features such as lane geometry, other roadway markings, parking lots, alleyways, and the like within the driving environment. For ML models trained to detect lane geometries (e.g., driving lane/road segment dimensions and orientations), the geometric shape head 312 may output data defining line segments and/or curves representing the lane markings. In such examples, the Voronoi diagram may partition the image space into different regions as described above, where each region is associated with the closest road segment in the labeled training data, and each pixel is encoded with the data defining the nearest lane geometry data. As noted above, generating Voronoi diagrams and/or similar techniques may provide particular advantages for training ML models to detect and segment small road features such as driving lanes, road segments, etc., because the Voronoi diagrams increase the area within the training data associated with each lane marking. Then, for ML models trained to detect and segment driving lanes, similar techniques may be used to generate masked training data based on the segmentation output, and then to train the segmentation head and geometric shape head based on the training data and masked training data, respectively.

Additionally, although these examples relate to ML models trained to detect lane geometries such as the dimensions and orientations driving lanes and road segments, in other examples, the ML models described herein can also include models trained to detect the geometrics (e.g., positions, sizes, and orientations) of other types of road features and/or lane markings, including (but not limited to) crosswalks, construction zones, speed bumps, loading zones, drivable surface areas, stop lines, yield lines, parking spaces, bus stops, etc.

Figure 8:
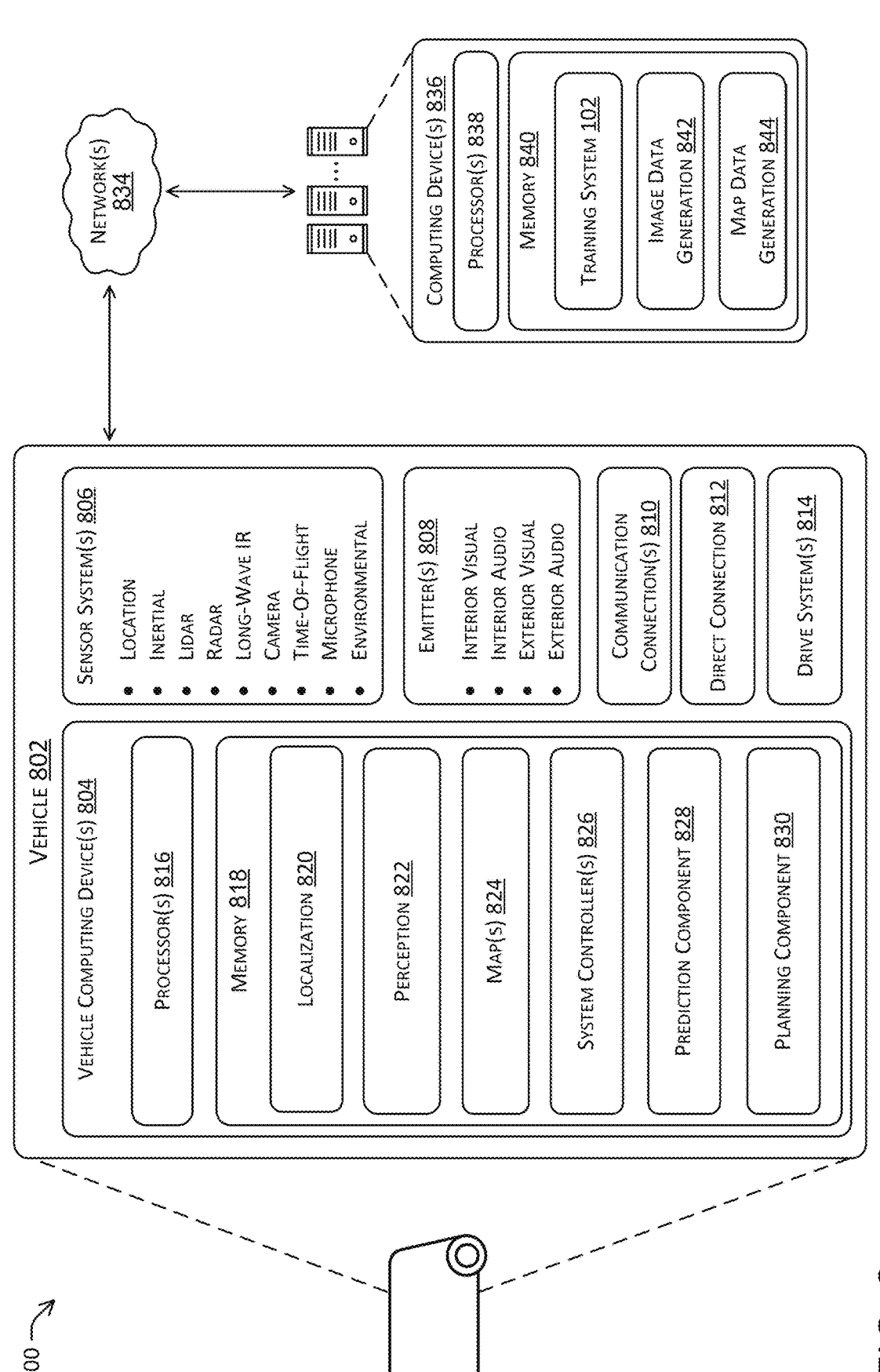
FIG. 8 depicts a block diagram of an example system for implementing various techniques described herein.

FIG. 8 depicts a block diagram of an example system 800 for implementing various techniques described herein. In some instances, the example system 800 may include a vehicle 802, which may represent a vehicle configured to traverse a driving environment based at least in part on map data, as discussed above in FIGS. 1-7. In some instances, the vehicle 802 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 802 may be a fully or partially autonomous vehicle having any other level or classification. Moreover, in some instances, the techniques described herein may be usable by non-autonomous vehicles as well. These are merely examples, and the systems and methods described herein also may be incorporated into any ground-borne, airborne, or waterborne vehicle, including those ranging from vehicles that need to be manually controlled by a driver at all times, to those that are partially or fully autonomously controlled.

The vehicle 802 which can be configured to perform various techniques described herein, including utilizing trained ML models for object detection and tracking, which may be deployed within the vehicle 802 while operating in a driving environment. In some examples, the vehicle 802 also may be configured to provide log data to one or more separate computing devices 836 configured to train ML models to perform object detection of road features as described herein. Additionally or alternatively, the vehicle 802 may receive and execute one or more ML models from separate computing devices 836, which may be integrated within a perception component configured to detect and track objects in the environment, based on multi-modal sensor data, using the various techniques described herein.

The vehicle 802 may include vehicle computing device(s) 804, sensor(s) 806, emitter(s) 808, network interface(s) 810, at least one direct connection 812 (e.g., for physically coupling with the vehicle to exchange data and/or to provide power), and one or more drive system(s) 814. The system 800 may additionally or alternatively comprise computing device(s) 804.

In some instances, the sensor(s) 806 may include lidar sensors, radar sensors, ultrasonic transducers, sonar sensors, location sensors (e.g., global positioning system (GPS), compass,), inertial sensors (e.g., inertial measurement units (ImUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 806 may include multiple instances of each of these or other types of sensors. For instance, the radar sensors may include individual radar sensors located at the corners, front, back, sides, and/or top of the vehicle 802. As another example, the cameras may include multiple cameras disposed at various locations about the exterior and/or interior of the vehicle 802. The sensor(s) 806 may provide input to the vehicle computing device(s) 804 and/or to computing device(s) 836.

The vehicle 802 may also include emitter(s) 808 for emitting light and/or sound, as described above. The emitter(s) 808 in this example may include interior audio and visual emitter(s) to communicate with passengers of the vehicle 802. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 808 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 802 may also include network interface(s) 810 that enable communication between the vehicle 802 and one or more other local or remote computing device(s). For instance, the network interface(s) 810 may facilitate communication with other local computing device(s) on the vehicle 802 and/or the drive systems(s) 814. Also, the network interface(s) 810 may additionally or alternatively allow the vehicle to communicate with other nearby computing device(s) (e.g., other nearby vehicles, traffic signals, etc.). The network interface(s) 810 may additionally or alternatively enable the vehicle 802 to communicate with computing device(s) 836. In some examples, computing device(s) 836 may comprise one or more nodes of a distributed computing system (e.g., a cloud computing architecture).

The network interface(s) 810 may include physical and/or logical interfaces for connecting the vehicle computing device(s) 804 to another computing device or a network, such as network(s) 834. For example, the network interface(s) 810 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 804 and/or the sensor(s) 806 may send sensor data, via the network(s) 834, to the computing device(s) 836 at a particular frequency, after a lapse of a predetermined period of time, in near real-time, etc.

In some instances, the vehicle 802 may include one or more drive systems(s) 814 (or drive components). In some instances, the vehicle 802 may have a single drive system 814. In some instances, the drive system(s) 814 may include one or more sensors to detect conditions of the drive system(s) 814 and/or the surroundings of the vehicle 802. By way of example and not limitation, the sensor(s) of the drive systems(s) 814 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive systems(s) 814. In some cases, the sensor(s) on the drive systems(s) 814 may overlap or supplement corresponding systems of the vehicle 802 (e.g., sensor(s) 806).'

The drive systems(s) 814 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive systems(s) 814 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive systems(s) 814. Furthermore, the drive systems(s) 814 may also include one or more communication connection(s) that enable communication by the respective drive component with one or more other local or remote computing device(s).

The vehicle computing device(s) 804 may include processor(s) 816 and memory 818 communicatively coupled with the one or more processors 816. Computing device(s) 836 may also include processor(s) 838, and/or memory 840. As described above, the memory 840 of the computing device(s) 836 may store and execute a training system 102, which may be similar or identical to the training system 102 described above in reference to FIGS. 1-7, and may be configured to perform any combination of training functionality of the training system 102 described herein.

The processor(s) 816 and/or 838 may be any suitable processor capable of executing instructions to process data and perform operations as described herein. By way of example and not limitation, the processor(s) 816 and/or 838 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 818 and/or 840 may be examples of non-transitory computer-readable media. The memory 818 and/or 840 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 818 and/or memory 840 may store a localization component 820, perception component 822, maps 824, system controller(s) 826, prediction component 828, and/or planning component 830.

As described herein the maps 824 may include map data generated by the computing device(s) 836, based on one or more ML model configured to detect and segment road features (e.g., driveways, lane geometry, etc.), which may be trained using a training system 102 as described in the examples herein. In some examples, the computing devices 836 configured may be configured to receive log data from vehicle 802 (and/or any number of additional vehicles) which include sensor data captured by the vehicle 802 of the driving environment. The computing devices 836 may include an image data generation component 842 configured to generate image data (e.g., top-down image data) based on sensor data captured by the vehicle 802 (and/or other vehicles). In other examples, the image data generation component 842 may receive aerial imagery representing a driving environment, such as drone images, traffic camera images, satellite images, etc. In either case, the image data generation component 842 may reproject and/or transform the imagery into top-down images of the driving environment.

The computing devices 836 may include a map data generation component 844 configured to generate map data based on the input image data generated by the image data generation component 842. To generate the map data, the map data generation component 844 may include use one or more ML models trained by the training system 102 to perform road feature detection and segmentation (e.g., ML model 302), as described in examples herein. After generating the map data using the map data generation component 844, the computing device(s) 836 may transmit the map data to the vehicle 802 to be used as and/or to supplement the map(s) 824 with road feature segmentation and parameter data.

In at least one example, the localization component 820 may include hardware and/or software to receive data from the sensor(s) 806 to determine a position, velocity, and/or orientation of the vehicle 802 (e.g., one or more of an x-, y-, z-position, roll, pitch, or yaw). For example, the localization component 820 may include map(s) of an environment and can continuously determine a location, velocity, and/or orientation of the autonomous vehicle within the map(s). In some instances, the localization component 820 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 820 may provide data to various components of the vehicle 802 to determine an initial position of an autonomous vehicle for generating a trajectory and/or for generating map data, as discussed herein. In some examples, localization component 820 may provide, to the planning component 830 and/or to the prediction component 828, a location and/or orientation of the vehicle 802 relative to the environment and/or sensor data associated therewith.

The memory 818 can further include one or more maps 824 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 824 may include at least one map (e.g., images and/or a mesh) generated in accordance with the techniques discussed herein. In some examples, the vehicle 802 can be controlled based at least in part on the maps 824. That is, the maps 824 can be used in connection with the localization component 820, the perception component 822, and/or the planning component 830 to determine a location of the vehicle 802, identify objects in an environment, and/or generate routes and/or trajectories to navigate within an environment.

In some instances, the perception component 822 may comprise a primary perception system and/or a prediction system implemented in hardware and/or software. The perception component 822 may detect object(s) in in an environment surrounding the vehicle 802 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 822 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 828 may include functionality to generate predicted information associated with objects in an environment. As an example, the prediction component 828 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 802 traverses an environment. In some examples, the prediction component 828 can generate one or more predicted positions, predicted velocities, predicted trajectories, etc., for such target objects based on attributes of the target object and/or other objects proximate the target object.

The planning component 830 may receive a location and/or orientation of the vehicle 802 from the localization component 820, perception data from the perception component 822, and/or predicted trajectories from the prediction component 828, and may determine instructions for controlling operation of the vehicle 802 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 826 and/or drive systems(s) 814 may parse/cause to be carried out, second instructions for the emitter(s) 808 may be formatted according to a second format associated therewith). In at least one example, the planning component 830 may comprise a nominal trajectory generation subcomponent that generates a set of candidate trajectories, and selects a trajectory for implementation by the drive systems(s) 814 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 818 and/or 840 may additionally or alternatively store a mapping system (e.g., generating a map based at least in part on sensor data), a planning system, a ride management system, etc. Although localization component 820, perception component 822, the prediction component 828, the planning component 830, and/or system controller(s) 826 are illustrated as being stored in memory 818, any of these components may include processor-executable instructions, machine-learned model(s) (e.g., a neural network), and/or hardware and all or part of any of these components may be stored on memory 840 or configured as part of computing device(s) 836.

As described herein, the localization component 820, the perception component 822, the prediction component 828, the planning component 830, and/or other components of the system 800 may comprise one or more ML models. For example, the localization component 820, the perception component 822, the prediction component 828, and/or the planning component 830 may each comprise different ML model pipelines. The prediction component 828 may use a different ML model or a combination of different ML models in different circumstances. For example, the prediction component 828 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise an attention mechanism, GNN, and/or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naive Bayes, Gaussian naive Bayes, multinomial naive Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 818 may additionally or alternatively store one or more system controller(s) 826, which may be configured to control steering, propulsion, braking, safety, emitters, communication, and other systems of the vehicle 802. These system controller(s) 826 may communicate with and/or control corresponding systems of the drive systems(s) 814 and/or other components of the vehicle 802.

In an additional or alternate example, vehicle 802 and/or computing device(s) 836 may communicate (e.g., transmit and/or receive messages over network(s) 834) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 802. For example, the passenger device may additionally or alternatively comprise a display and/or one or more input/output devices, such as a touchscreen, microphone, speaker, and/or the like. In some examples, the vehicle 802 may transmit messages and/or receive messages from the passenger device.

It should be noted that while FIG. 8 is illustrated as a distributed system, in alternative examples, components of the vehicle 802 may be associated with the computing device(s) 836 and/or components of the computing device(s) 836 may be associated with the vehicle 802. That is, the vehicle 802 may perform one or more of the functions associated with the computing device(s) 836, and vice versa.

FIG. 9 is a flow diagram illustrating an example process 900 of training a machine-learning model configured to detect and segment road features based on image data. The ML model training process described in process 900 may be performed by a training system 102, using techniques similar or identical to those described above in FIGS. 1-8. For example, an ML model 302 trained via process 900 may include a segmentation output head 310 configured to output the likelihood of road feature being present at each location in the image data, and a separate geometric shape output head 312 configured to output a geometric shape indicating the location, size, and shape of a predicted road feature at each location in the image data. As described below, process 900 may use a self-supervised learning technique in which the output of the segmentation head 310 of the ML model 302 is used as self-supervision for training the geometric shape head 312.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the training system 102 may receive image data of a driving environment. As noted above, the image data 400 may include one or more visual images (e.g., RBG) representing a top-down view of a driving environment. In some cases, the image data may include multiple input layers, such as a laser intensity layer, a height gradient layer, and a semantic layer based on lidar sensor data. In some cases, the image data also may include a combination of multiple sensor modalities.

At operation 904, the training system 102 may provide the image data to the road feature detection ML model 302. The ML model 302 may be implemented as a U-Net model, other CNN, or using a vision transformer architecture, and may be configured with multiple output heads. A segmentation head 310 of the ML model 302 may output, for each location (e.g., pixel) in the image data, an indication of the likelihood that a particular type of road feature (e.g., driveway, lane geometry, etc. is present at the location. Additionally, a geometric shape head 312 of the ML model 302 may output, for each location, parameter data defining a location, size, and shape, of a road feature predicted at the location.

Between operation 906 and operation 916, the training system 102 may train the ML model 302 within different regions or locations (e.g., pixels) of the output, including training based on the output of the segmentation head 310 and the output of the geometric shape head 312. As shown in this example, at operation 906 the training system 102 may iterate over the various regions or locations in the image data, during which the ML model is trained/regressed based on the output of the segmentation head 310, and also may be train/regressed based on the output of the geometric shape head 312 only in the unmasked regions of the masked training data (e.g., not trained/regressed in the masked regions of the masked training data).

At operation 908, the training system 102 may train the ML model 302 based on the output of the segmentation head 310. For example, the training system 102 may use one or more loss and/or backpropagation components to evaluate the output of the segmentation head 310 in comparison to the training data, and to regress the ML model 302 based on the evaluation. As discussed above, the output of the segmentation head 310 (e.g., pixel-by-pixel determinations of predictions of whether a road feature is likely to be present at each location in the input image) may be compared to the labeled training data, and the ML model 302 may be regressed based on the evaluation.

At operation 910, the training system 102 may determine masked training data based on the segmentation output. In some examples, the training system 102 may be configured to generate a Voronoi diagram based on the labeled image data, partitioning the image into a set of regions each associated with a labeled road feature from the image data. Each pixel in the Voronoi diagram may be encoded with parameters based on the labeled road feature closest to the pixel. Additionally, the training system 102 may be configured to mask the Voronoi diagram based on the output of the segmentation head 310, thereby generating the masked training data in operation 908.

At operation 912, the training system 102 may determine, for a particular region (e.g., location or set of pixels) in the image data, whether the segmentation output of the ML model 302 has predicted that a road feature is likely to be present at the location. The determination in operation 912 may correspond to determining whether the location is a masked or unmasked location within the masked training data generated in operation 910.

At operation 914, when the segmentation output indicates that a road feature is predicted at the location (912: Yes), the training system 102 may train the ML model 302 further based on the output of the geometric shape head 312. For example, the training system 102 may evaluate the output of the geometric shape head 312 in the unmasked regions of the masked training data, by comparing the output to the labeled road features in the training data, and may regress the geometric shape head 312 of the ML model 302 based on the evaluation.

In contrast, when the segmentation output indicates that a road feature is not predicted at the location (912: No), then the training system 102 may be configured not to regress the geometric shape head 312 at that location. In such examples, the training system 102 may exclude the training in operation 914 for the masked regions in the masked training data, and may proceed to operation 906 to evaluate the next location in the image data.

EXAMPLE CLAUSES

A. A system for training a self-supervised machine-learned model comprising: one or more processors; and one or more non-transitory computer-readable media storing computer-executable instructions that, when executed, cause the one or more processors to perform operations comprising: receiving top-down image data associated with a driving environment representing the environment from a top-down perspective; receiving training data associated with a road feature type, the training data associated with the top-down image data; providing the top-down image data as input to a machine-learned model comprising: a first subset of output layers configured to output a segmentation output indicating a likelihood of a road feature of the road feature type being present at a location in the top-down image data; and a second subset of output layers configured to output a geometric shape output indicating dimensions of a predicted road feature of the road feature type at the location in the top-down image data; determining, based at least in part on the segmentation output, a first prediction of a road feature being present at a first location in the top-down image data; training the machine-learned model based at least in part on a comparison between the geometric shape output and the training data at the first location; determining, based at least in part on the segmentation output, a second prediction of an absence of a road feature at a second location in the top-down image data; and refraining, based at least in part on the second prediction, from training the machine-learned model based on the geometric shape output at the second location.

B. The system of paragraph A, the operations further comprising: receiving labeled image data of the driving environment; generating a Voronoi diagram based on the labeled image data; and generating the training data, based at least in part on the Voronoi diagram.

C. The system of paragraph B, wherein generating the training data comprises: determining a mask based at least in part on the segmentation output of the machine-learned model; and applying the mask to the Voronoi diagram.

D. The system of paragraph A, wherein the road feature type comprises at least one of: a driveway road feature type; a parking lot road feature type; an alleyway road feature type; or a driving lane road feature type.

E. The system of paragraph A, the operations further comprising: generating map data based at least in part on the machine-learned model; and transmitting the map data to an autonomous vehicle configured to use the map data to control the operation of the autonomous vehicle in the driving environment.

F. A method comprising: receiving data associated with a driving environment; providing the data as input to a machine-learned model; receiving, from a first portion of the machine-learning model, a segmentation output indicating a likelihood of a road feature of a road feature type being present at a first location; receiving, from a second portion of the machine-learning model, a geometric shape output representing a predicted road feature of the road feature type associated with the first location; and modifying a set of parameters associated with the machine-learned model based at least in part on a comparison between the segmentation output and the training data; and based at least in part on a likelihood indicated by the segmentation output meeting or exceeding a threshold likelihood modifying the set of parameters associated with the machine-learned model based at least in part on a comparison between the geometric shape output and the training data.

G. The method of paragraph F, further comprising: refraining from modifying the machine-learned model based at least in part on a portion of the first segmentation output having no indication of being associated with the road type feature.

H. The method of paragraph F, further comprising: receiving labeled image data of the driving environment; generating a Voronoi diagram based on the labeled image data; and generating the training data, based at least in part on the Voronoi diagram.

I. The method of paragraph H, further comprising: determining a mask based at least in part on the segmentation output of the machine-learned model; and applying the mask to the Voronoi diagram to generate masked data, wherein modifying the machine-learned model is based at least in part on the masked data.

J. The method of paragraph F, wherein the machine-learned model comprises at least one of a convolutional neural network (CNN) or a vision transformer model, and wherein the machine-learned model is configured to output, for each particular location of a plurality of locations in the image data: a first subset of output layers corresponding to the segmentation output at the particular location; and a second subset of output layers representing dimensions of a road feature of the road feature type predicted at the particular location.

K. The method of paragraph F, wherein the road feature type comprises at least one of: a driveway road feature type, a parking lot road feature type, an alleyway road feature type, or a driving lane road feature type.

L. The method of paragraph F, further comprising generating the data, wherein generating the data comprises: receiving vehicle sensor data capture by a vehicle traversing the driving environment; and generating, based at least in part on the vehicle sensor data, a top-down image of the driving environment.

M. The method of paragraph F, further comprising: generating map data based at least in part on the machine-learned model; and transmitting the map data to an autonomous vehicle configured to use the map data to control operations of the autonomous vehicle in the driving environment.

N. One or more non transitory computer readable media storing instructions executable by one or more processors, wherein the instructions, when executed, cause the one or more processors to perform operations comprising: receiving data associated with a driving environment; providing the data as input to a machine-learned model; receiving, from a first portion of the machine-learning model, a segmentation output indicating a likelihood of a road feature of a road feature type being present at a first location; receiving, from a second portion of the machine-learning model, a geometric shape output representing a predicted road feature of the road feature type associated with the first location; and modifying a set of parameters associated with the machine-learned model based at least in part on a comparison between the segmentation output and the training data; and based at least in part on a likelihood indicated by the segmentation output meeting or exceeding a threshold likelihood modifying the set of parameters associated with the machine-learned model based at least in part on a comparison between the geometric shape output and the training data.

O. The one or more non transitory computer readable media of paragraph N, the operations further comprising: refraining from modifying the machine-learned model based at least in part on a portion of the first segmentation output having no indication of being associated with the road type feature.

P. The one or more non transitory computer readable media of paragraph N, the operations further comprising: receiving labeled image data of the driving environment; generating a Voronoi diagram based on the labeled image data; and generating the training data, based at least in part on the Voronoi diagram.

Q. The one or more non transitory computer readable media of paragraph P, the operations further comprising: determining a mask based at least in part on the segmentation output of the machine-learned model; and applying the mask to the Voronoi diagram to generate masked data, wherein modifying the machine-learned model is based at least in part on the masked data.

R. The one or more non transitory computer readable media of paragraph Q, wherein the machine-learned model comprises at least one of a convolutional neural network (CNN) or a vision transformer model, and wherein the machine-learned model is configured to output, for each particular location of a plurality of locations in the image data: a first subset of output layers corresponding to the segmentation output at the particular location; and a second subset of output layers representing dimensions of a road feature of the road feature type predicted at the particular location.

S. The one or more non transitory computer readable media of paragraph N, wherein the road feature type comprises at least one of: a driveway road feature type, a parking lot road feature type, an alleyway road feature type, or a driving lane road feature type.

T. The one or more non transitory computer readable media of paragraph N, the operations further comprising generating the data, wherein generating the data comprises: receiving vehicle sensor data capture by a vehicle traversing the driving environment; and generating, based at least in part on the vehicle sensor data, a top-down image of the driving environment.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system for training a self-supervised machine-learned model comprising:

one or more processors; and one or more non-transitory computer-readable media storing computer-executable instructions that, when executed, cause the one or more processors to perform operations comprising:

receiving top-down image data associated with a driving environment representing the driving environment from a top-down perspective;

receiving training data associated with a road feature type, the training data associated with the top-down image data;

providing the top-down image data as input to a machine-learned model comprising:

a first subset of output layers configured to output a segmentation output indicating a likelihood of a road feature of the road feature type being present at a location in the top-down image data; and a second subset of output layers configured to output a geometric shape output indicating dimensions of a predicted road feature of the road feature type at the location in the top-down image data;

determining, based at least in part on the segmentation output, a first prediction of a road feature being present at a first location in the top-down image data;

training the machine-learned model based at least in part on a comparison between the geometric shape output and the training data at the first location;

determining, based at least in part on the segmentation output, a second prediction of an absence of a road feature at a second location in the top-down image data; and refraining, based at least in part on the second prediction, from training the machine-learned model based on the geometric shape output at the second location.

2. The system of claim 1, the operations further comprising:

receiving labeled image data of the driving environment;

generating a Voronoi diagram based on the labeled image data; and generating the training data, based at least in part on the Voronoi diagram.

3. The system of claim 2, wherein generating the training data comprises:

determining a mask based at least in part on the segmentation output of the machine-learned model; and applying the mask to the Voronoi diagram.

4. The system of claim 1, wherein the road feature type comprises at least one of:

a driveway road feature type;

a parking lot road feature type;

an alleyway road feature type; or a driving lane road feature type.

5. The system of claim 1, the operations further comprising:

generating map data based at least in part on the machine-learned model; and transmitting the map data to an autonomous vehicle configured to use the map data to control operation of the autonomous vehicle in the driving environment.

6. A method comprising:

receiving labeled image data of a driving environment;

generating, based on the labeled image data, a data structure representative of a Voronoi diagram;

generating training data, based at least in part on the data structure;

receiving data associated with the driving environment;

providing the data as input to a machine-learned model;

receiving, from a first portion of the machine-learned model, a segmentation output indicating a likelihood of a road feature of a road feature type being present at a first location;

receiving, from a second portion of the machine-learned model, a geometric shape output representing a pre-dicted road feature of the road feature type associated with the first location;

modifying a set of parameters associated with the machine-learned model based at least in part on a comparison between the segmentation output and the training data;

based at least in part on a likelihood indicated by the segmentation output meeting or exceeding a threshold likelihood modifying the set of parameters associated with the machine-learned model based at least in part on a comparison between the geometric shape output and the training data.

7. The method of claim 6, further comprising:

refraining from modifying the machine-learned model based at least in part on a portion of the segmentation output having no indication of being associated with the road feature type.

8. The method of claim 6, further comprising:

determining a mask based at least in part on the segmen-tation output of the machine-learned model; and applying the mask to the Voronoi diagram to generate masked data, wherein modifying the machine-learned model is based at least in part on the masked data.

9. The method of claim 6, wherein the machine-learned model comprises at least one of a convolutional neural network (CNN) or a vision transformer model, and wherein the machine-learned model is configured to output, for each particular location of a plurality of locations in the data:

a first subset of output layers corresponding to the seg-mentation output at the particular location; and a second subset of output layers representing dimensions of a road feature of the road feature type predicted at the particular location.

10. The method of claim 6, wherein the road feature type comprises at least one of:

a driveway road feature type, a parking lot road feature type, an alleyway road feature type, or a driving lane road feature type.

11. The method of claim 6, further comprising generating the data, wherein generating the data comprises:

receiving vehicle sensor data captured by a vehicle tra-versing the driving environment; and generating, based at least in part on the vehicle sensor data, a top-down image of the driving environment.

12. The method of claim 6, further comprising:

generating map data based at least in part on the machine-learned model; and transmitting the map data to an autonomous vehicle configured to use the map data to control operations of the autonomous vehicle in the driving environment.

13. One or more non-transitory computer-readable media storing instructions executable by one or more processors, wherein the instructions, when executed, cause the one or more processors to perform operations comprising:

receiving data associated with a driving environment;

providing the data as input to a machine-learned model;

receiving, from a first portion of the machine-learned model, a segmentation output indicating a likelihood of a road feature of a road feature type being present at a first location;

receiving, from a second portion of the machine-learned model, a geometric shape output representing a pre-dicted road feature of the road feature type associated with the first location; and modifying a set of parameters associated with the machine-learned model based at least in part on a comparison between the segmentation output and train-ing data, wherein modifying the set of parameters comprises:

when the segmentation output meets or exceeds a threshold likelihood, modifying the set of parameters associated with the machine-learned model based at least in part on a comparison between the geometric shape output and the training data; and when the segmentation output does not meet or exceed the threshold likelihood, refraining from modifying the set of parameters.

14. The one or more non-transitory computer-readable media of claim 13, the operations further comprising:

receiving labeled image data of the driving environment;

generating a Voronoi diagram based on the labeled image data; and generating the training data, based at least in part on the Voronoi diagram.

15. The one or more non-transitory computer-readable media of claim 14, the operations further comprising:

determining a mask based at least in part on the segmen-tation output of the machine-learned model; and applying the mask to the Voronoi diagram to generate masked data, wherein modifying the machine-learned model is based at least in part on the masked data.

16. The one or more non-transitory computer-readable media of claim 13, wherein the machine-learned model comprises at least one of a convolutional neural network (CNN) or a vision transformer model, and wherein the machine-learned model is configured to output, for each particular location of a plurality of locations in the data:

a first subset of output layers corresponding to the seg-mentation output at the particular location; and a second subset of output layers representing dimensions of a road feature of the road feature type predicted at the particular location.

17. The one or more non-transitory computer-readable media of claim 13, wherein the road feature type comprises at least one of:

a driveway road feature type, a parking lot road feature type, an alleyway road feature type, or a driving lane road feature type.

18. The one or more non-transitory computer-readable media of claim 13, the operations further comprising gen-erating the data, wherein generating the data comprises:

receiving vehicle sensor data captured by a vehicle tra-versing the driving environment; and generating, based at least in part on the vehicle sensor data, a top-down image of the driving environment.

* * * * *